Sept. 1, 1931.                D. D. PEEBLES                 1,820,986
                     ODORLESS DESICCATING METHOD AND SYSTEM
                              Filed March 18, 1929
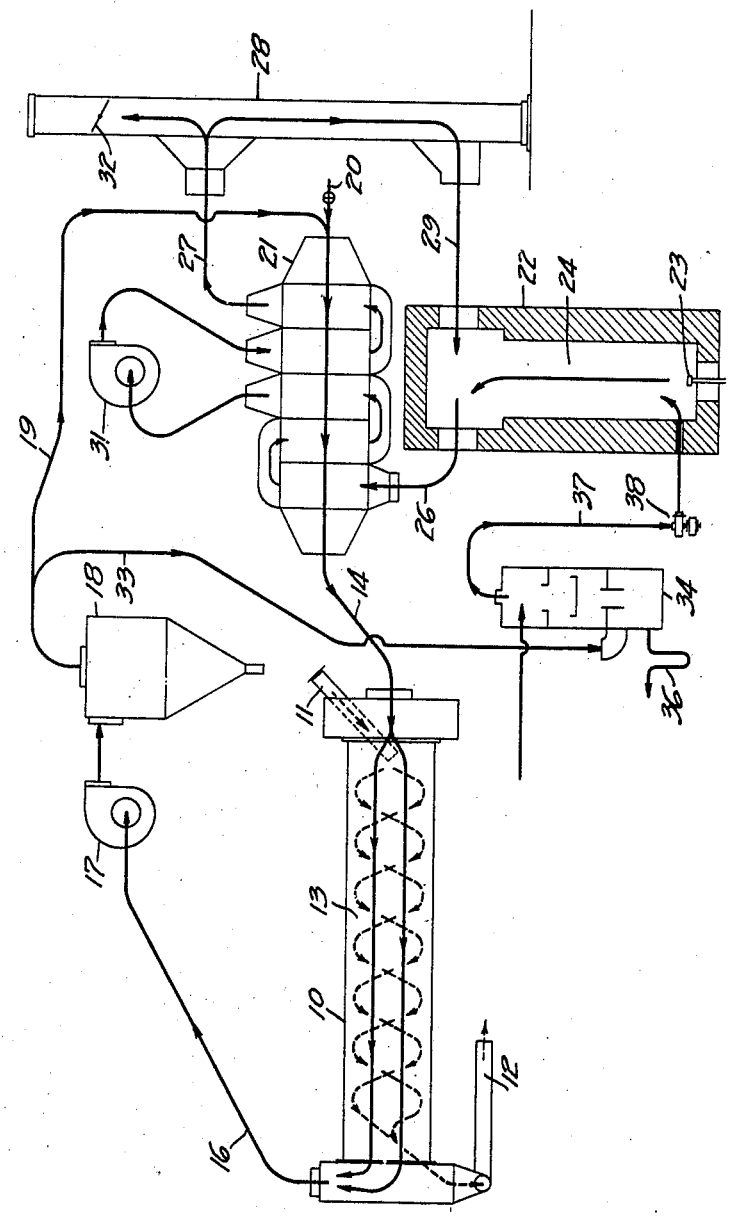
INVENTOR
*David D. Peebles*
BY
*White, Prost & Fryer*
ATTORNEYS Patented Sept. 1, 1931

1,820,986

UNITED STATES PATENT OFFICE

DAVID D. PEEBLES, OF EUREKA, CALIFORNIA, ASSIGNOR TO F. E. BOOTH COMPANY, INC., OF SAN FRANCISCO, CALIFORNIA, A CORPORATION OF NEVADA

ODORLESS DESICCATING METHOD AND SYSTEM

Application filed March 18, 1929. Serial No. 347,836.

This invention relates generally to methods and systems for the odorless desiccation of organic materials like fish meal, which readily oxidizes and evolves objectionable odorous gases when heated.

It is a general object of this invention to devise a simple and effective method and system of the above character, in which the quantity of odorous gases handled is kept at a minimum by preventing oxidation of the organic material being treated, and in which such odorous gases are separated in concentrated form of combustion.

Further objects of the invention will appear from the following description in which I have set forth the preferred embodiment of my invention. It is to be understood that the appended claims are to be accorded a range of equivalents consistent with the state of the prior art.

In the past many methods have been proposed for preventing discharge of objectionable odors in systems involving the heat treatment of organic material. These odors are particularly objectionable when treating certain organic material, as when desiccating fish meal. Insofar as I am aware these prior methods have been of little value, and have merely served to modify the odors to a certain degree.

In studying this problem for a practical solution, I have made the remarkable discovery that odorous gases can be more readily disposed of when in concentrated rather than dilute form. This discovery is contrary to the general teaching of the art, and in fact it has previously been proposed to dilute odorous gases with other gas, such as air, and then discharge the diluted mixture into a furnace or furnace stack. In order to make possible the recovery of odorous gases in concentrated form, I have evolved a method utilizing an inert condensible fluid medium, as will be presently described. The use of such a medium led to the further discovery that organic material, like fish meal, when being heat treated, tends to oxidize if exposed to the air. This oxidation is not only objectionable because of the detrimental effect it produces upon the final product, but it causes the production of additional odorous gases. In my process such oxidation is prevented, and therefore the quantity of odorous gases is reduced to a minimum.

In carrying out the method of my invention, as in desiccating fish meal which will evolve odorous gases when heated, I envelope the material in an inert fluid medium including superheated steam. Odorous gases are evolved from the material and intermixed with the treating fluid, but since active or oxidizing gases are kept from contact with the material, production of additional odorous gases thru oxidation is prevented. The inert treating fluid together with intermixed odorous gases and water vapor evolved from the fish meal is then removed from the chamber and the odorous gases are separated by suitable means. I prefer that this separation be effected by a condensation method. Thus the removed fluid mixture is passed thru a suitable condenser, whereby the steam is removed as water, leaving the concentrated odorous gases. These gases are then rendered odorless by combustion.

In the drawing I have illustrated diagrammatically an apparatus suitable for carrying out the preferred form of my method. The fish meal to be treated is introduced into a suitable rotary drier 10. Driers of this type are well known in the art, and it is sufficient to state that the wet fish meal is introduced into the inlet 11, and can be removed from the outlet 12. The entire structure is closed from the surrounding atmosphere, so as to form a relatively closed treatment chamber 13. The inert treating fluid, preferably superheated steam, can be introduced into the drier 10 thru a pipe line indicated at 14, and can be removed thru pipe line 16. Preferably the material within this drier is advanced in the same direction as the flow of the inert treating medium, as indicated by the dotted arrows.

In order to cause the treating fluid to flow thru the drier, I prefer to form a closed external circuit in which fluid removed thru pipe line 16 is heated and again introduced into pipe line 14. As representative of such a closed circuit I have shown a fan or blower 17 receiving fluid from pipe line 16 and introducing the same under pressure to a separator 18. Separator 18 can be of the ordinary cyclonic type and serves to remove any solid material carried over with the fluid from the drier 10. Fluid is removed from separator 18 and passed thru pipe line 19, to the heat exchanger 21, from which it is again introduced into pipe line 14. For supplying heat to the exchanger 21 I have shown a furnace 22 having suitable means for supplying fuel to the same, such as an oil burner 23, and having a combustion chamber 24. Products of combustion from this furnace are introduced into the heat exchanger 21, thru a flue 26, and are removed from the heat exchanger thru a conduit 27 from which they are introduced into a suitable stack 28. In order to increase the total amount of hot gas passed thru the heat exchanger for a furnace of given capacity, thus increasing the thermal efficiency of the system, I prefer to recirculate a certain amount of the products of combustion back into the heat exchanger from the conduit 27. Thus I have shown conduit 29 interconnecting the stack 28 with the furnace 22, and I have shown suitable means such as a fan 31, for effecting continual recirculation of a certain quantity of gas. The inlet and outlet of fan 31 can be conveniently connected between certain passes of the heat exchanger 21 as shown. The proportion of products of combustion recirculated thru the heat exchanger, can be controlled by a damper 32 in stack 28.

For removing ordorous gases from the treating fluid, I have shown a pipe or conduit 33 communicating with pipe 19, and leading to a suitable condenser 34. Condensed fluid is removed from the condenser 34, thru a suitable outflow trap 36, while the separated concentrated ordorous gases are removed thru pipe 37. For effecting combustion of the odorous gases, I preferably introduce them into the combustion chamber 24 of furnace 22, and accordingly I have shown pipe 37 connected to the lower part of the combustion chamber thru a suitable fan or blower 38.

In treating fish meal with the above described apparatus, this meal is introduced into the rotary drier 10 thru inlet 11 in wet condition, containing say 50% of water. The drier is of course rotating at this time so that the fish meal within treatment chamber 13 is continually agitated. At this time it is presumed that the furnace 22 is in operation and that products of combustion are being passed thru the heat exchanger 21. Fan 17 is then put into operation to withdraw fluid from pipe 16 and to introduce heated fluid thru pipe 14. In order to aid in getting the apparatus into normal operation, a certain amount of steam may be introduced into the circulating system, thru pipe 20. It is to be understood however that after the system and method is in normal operation, no additional introduction of steam is required, and the method operates from vapor recovered from the fish meal or other material being treated. Assuming however that a certain amount of steam has been introduced thru pipe 20, fan 17 then circulates a mixture of air and steam thru the treatment chamber 13. The steam introduced into chamber 13 is superheated to a substantial degree, by heat exchanger 21. The material within chamber 13 gradually becomes heated, and eventually reaches the temperature at which water vapor and odorous gases are evolved. During this time preliminary to normal operation, a mixture of steam and air is removed thru pipe 33, and passed thru condenser 34. Non-condensible gases, which before normal operation will consist of air possibly mixed with odorous gases, are removed thru pipe 37 and introduced into furnace 22. Since no external air is allowed to enter the circulation system for the treating fluid, and as air is initially removed thru pipe 33, it is apparent that after the system has been in operation for a certain time, substantially all air will have disappeared, and the treating fluid will consist of superheated steam carrying no active oxidizing gases. After the system has thus attained normal operation, a certain amount of wet meal can be continuously introduced into inlet 11, while the dried meal is continuously removed thru outlet 12. The treating steam is preferably superheated both at the inflow and at the outflow from the drier 10, and for convenience is preferably at substantially atmospheric pressure within the treatment chamber 13. Good results have been attained by introducing the superheated steam thru pipe 14 at a temperature of about 600 deg. F., and removing the same thru pipe 16 at about 300 deg. F.

As has been explained above, after the system attains normal operation, substantially all of the air has been removed thru the condenser 34. Therefore, normally, the fluid removed thru pipe 33 consists of superheated steam mixed with concentrated odorous gases. Upon distillation of this mixture in the condenser 34, the odorous gases, which are not condensed, are removed thru pipe 37 and introduced into the combustion chamber 24. Furnace 22 is preferably operated at a relatively high temperature, say at a temperature of 2000 deg. F. or more. Combustion of such concentrated odorous gases introduced in this manner is complete, and no objectionable odors are discharged thru the stack 28. I have found that the condensed liquid removed from condenser 34 is substantially unpolluted and will not evolve objectionable odors at ordinary temperatures. Therefore no special provision need be made for handling the discharge thru trap 36, and this discharge can be led to a convenient sewer.

As has been previously mentioned, prior processes have attempted to burn odorous gases in order to effect deodorization. In my method, however, combustion of odorous gases has a particular significance and is effective due to the fact that these gases as introduced into the furnace 22 are in concentrated undiluted form. Furthermore complete deodorization in my method is aided by the fact that the fish meal or organic material treated in chamber 13 is not oxidized during its treatment.

The fact that the material being treated is not oxidized during operation of my method, makes possible new and improved products. For example the product resulting from desiccation of fish meal by my method, is relatively light in color due to the absence of oxidation. It has a high nutriment value and better flavor, and is able to command a high price upon the market. Fish meal desiccated by prior processes is relatively dark in color, due to its oxidation.

This application is a continuation of my earlier application Serial No. 165,298, filed February 2, 1927.

I claim:

1. An odorless method of desiccating fish meal to produce a dried product valuable as a stock feed, comprising the steps of continually introducing a fluid medium containing superheated steam into a chamber, continually feeding wet fish meal into one part of said chamber, continually removing desiccated fish meal from another part of said chamber, the fluid medium within the chamber contacting with the fish meal to heat and dry the same, continually removing a fluid medium from said chamber consisting of the introduced fluid medium together with water vapor and odorous gases evolved from the fish meal, diverting a portion of the removed fluid medium, condensing water from the diverted portion, burning the uncondensed concentrated odorous gases of said diverted portion to destroy the objectionable odor thereof, heating the remainder of said removed fluid medium to effect a substantial degree of superheat, and utilizing said heated medium for effecting the first mentioned step of the method, thus forming a closed cycle from which air is excluded.

2. An odorless method of desiccating fish meal to produce a dried product valuable as a stock feed, comprising the steps of continually introducing a fluid medium containing superheated steam into a chamber, continually feeding wet fish meal into one part of said chamber, continually removing desiccated fish meal from another part of said chamber, the fluid medium within the chamber contacting with the fish meal to heat and dry the same, continually removing a fluid medium from said chamber consisting of the introduced fluid medium together with water vapor and odorous gases evolved from the fish meal, separating entrained solids from said removed fluid medium, continually diverting a portion of the removed fluid medium after said separation has been effected, condensing water from the diverted portion, burning the uncondensed concentrated gases of said diverted portion to destroy the objectionable odor thereof, heating the remainder of said removed fluid medium to effect a substantial degree of superheat, and utilizing said heated medium for effecting the first mentioned step of the method, thus forming a closed cycle from which air is excluded.

In testimony whereof, I have hereunto set my hand.

DAVID D. PEEBLES.